US010090091B2

United States Patent
Girlinger

(10) Patent No.: US 10,090,091 B2
(45) Date of Patent: Oct. 2, 2018

(54) MAGNET ASSEMBLY FOR A SOLENOID VALVE

(71) Applicant: Robert Bosch GmbH, Stuttgart (DE)

(72) Inventor: Gerhard Girlinger, Leonding (AT)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 15/101,694

(22) PCT Filed: Nov. 28, 2014

(86) PCT No.: PCT/EP2014/075964
§ 371 (c)(1),
(2) Date: Jun. 3, 2016

(87) PCT Pub. No.: WO2015/082353
PCT Pub. Date: Jun. 11, 2015

(65) Prior Publication Data
US 2016/0307682 A1 Oct. 20, 2016

(30) Foreign Application Priority Data
Dec. 3, 2013 (DE) .................. 10 2013 224 719

(51) Int. Cl.
*F16K 27/02* (2006.01)
*F16K 31/06* (2006.01)
(Continued)

(52) U.S. Cl.
CPC ......... *H01F 7/081* (2013.01); *F02M 51/0614* (2013.01); *F16K 31/0675* (2013.01); *H01F 7/128* (2013.01); *H01F 7/1638* (2013.01)

(58) Field of Classification Search
CPC ............... F16K 27/029; F16K 31/0655; F16K 31/0658; F16K 31/0675; H01F 2007/083; H01F 7/128; H01F 7/1638; F02M 51/0614
(Continued)

(56) References Cited

U.S. PATENT DOCUMENTS 3,921,670 A 11/1975 Clippard et al.
3,960,361 A * 6/1976 York .................. F16K 31/0606
137/625.65
(Continued)

FOREIGN PATENT DOCUMENTS

DE 3804011 7/1989
DE 202008008650 11/2009
(Continued)

OTHER PUBLICATIONS

International Search Report for Application No. PCT/EP2014/075964 dated Feb. 27, 2015 (English Translation, 3 pages).

*Primary Examiner* — Seth W Mackay-Smith
(74) *Attorney, Agent, or Firm* — Michael Best & Friedrich LLP

(57) ABSTRACT

The invention relates to a magnet assembly for a solenoid valve, comprising a magnetic core (3), composed of at least two core elements (1, 2), and a magnetic coil (4), said magnetic core being connected in an annular recess (5) of a core element (1). According to the invention, the recess (5) on the side of a terminal surface (6) which forms the core element (1), is closed in a media-tight manner via a web portion (7). The invention further relates to a solenoid valve comprising such a magnet assembly.

14 Claims, 2 Drawing Sheets

(51) Int. Cl.
*H01F 7/128* (2006.01)
*H01F 7/08* (2006.01)
*F02M 51/06* (2006.01)
*H01F 7/16* (2006.01)

(58) Field of Classification Search
USPC .................................................. 251/129.16
See application file for complete search history.

(56) References Cited

U.S. PATENT DOCUMENTS

| | | | | |
|---|---|---|---|---|
| 5,348,233 | A * | 9/1994 | Press | F02M 51/0639 239/585.3 |
| 5,395,048 | A * | 3/1995 | Ricco | F02M 47/027 239/533.8 |
| 5,417,403 | A * | 5/1995 | Shurman | F02M 59/466 251/129.16 |
| 5,878,965 | A * | 3/1999 | Coldren | F02M 55/04 239/533.3 |
| 6,161,813 | A * | 12/2000 | Baumgartner | F02M 47/027 251/129.16 |
| 6,288,409 | B1 * | 9/2001 | Maier | F02M 51/0614 250/559.4 |
| 6,496,092 | B1 * | 12/2002 | Schnatterer | F16K 31/0679 251/129.09 |
| 6,517,045 | B1 * | 2/2003 | Northedge | F16K 31/082 251/129.16 |
| 6,598,944 | B1 * | 7/2003 | Wolff | B60T 8/363 303/119.2 |
| 7,552,909 | B2 * | 6/2009 | Ricco | F02M 47/027 239/533.2 |
| 7,878,214 | B1 * | 2/2011 | Jansen | B64D 37/34 137/12 |
| 8,002,206 | B2 * | 8/2011 | Shafer | F02M 47/027 174/51 |
| 8,037,869 | B2 * | 10/2011 | Ricco | F02M 47/027 123/472 |
| 2004/0144940 | A1 * | 7/2004 | Seol | F16K 31/0651 251/129.1 |
| 2006/0202145 | A1 * | 9/2006 | Ricco | F02M 47/027 251/129.16 |

FOREIGN PATENT DOCUMENTS

| | | |
|---|---|---|
| EP | 0891231 | 1/1999 |
| EP | 2366888 | 9/2011 |
| FR | 1605244 | 9/1973 |
| WO | 2014067750 | 5/2014 |

* cited by examiner

MAGNET ASSEMBLY FOR A SOLENOID VALVE

BACKGROUND OF THE INVENTION

The invention relates to a magnet assembly for a solenoid valve. The invention further proposes a solenoid valve comprising a magnet assembly of this kind.

In solenoid valves, the magnet core of a magnet assembly is usually interrupted at the pole face between an internal pole and an external pole in order to allow installation of a magnet coil from the pole face side. A magnet core of this kind for a magnet assembly is disclosed, for example, in utility model specification DE 20 2008 008 650 U1. The magnet core disclosed in said document is composed of at least two core elements, at least one core element from amongst said two core elements being in the form of a sinter element. A magnet core which allows the use of relatively large coils with the external dimensions remaining the same and at the same time guarantees reduced eddy currents is intended to be provided in this way. In this case, a core element can be of pot-like design and comprise an external pole section, an internal pole section and also a yoke section which connects the external pole section and the internal pole section in the radial direction, wherein the sections delimit an annular receiving opening for receiving a magnet coil. On that side which is averted from the yoke section, the receiving opening is covered by a pole face element which only partially projects beyond the opening in the radial direction and forms a stroke stop for a plate-like magnet armature.

If the magnet core of a magnet assembly of this kind is surrounded by an operating medium, which is liquid, gaseous, aggressive and/or highly flammable, during operation of the solenoid valve, it is necessary to seal off the space which receives the magnet coil from the surrounding area which contains the operating medium. This is because contact between the magnet coil and the operating medium can lead to damage to the coil. For example, the ingress of conductive particles by means of the operating medium can lead to a short circuit which may result in the formation of sparks and/or in complete functional breakdown. In the event of sparks forming, there is also a risk of electrical overloading of the coil winding and/or—depending on the operating medium respectively used—a fire and/or explosion risk.

SUMMARY OF THE INVENTION

Proceeding from the abovementioned prior art, the present invention is therefore based on the object of proposing a magnet assembly for a solenoid valve which has an improved sealing concept. In addition, the proposed magnet assembly is intended to be of simple construction and easy to mount.

A magnet assembly is proposed for achieving the object. Furthermore, a solenoid valve comprising a magnet assembly of this kind is proposed.

The proposed magnet assembly comprises a magnet core, which is composed of at least two core elements, and a magnet coil, which is inserted into an annular recess in a core element. According to the invention, the recess is closed in a media-tight manner by means of a web section on the side of a pole face which forms the core element. In the process, the web section preferably connects an external pole section, which delimits the recess radially on the outside, and an internal pole section, which delimits the recess radially on the inside, of the core element. To this end, the core element is furthermore preferably produced in a continuous manner from a solid material, wherein the web section can be designed to be comparatively thin in comparison to the external pole section and/or the internal pole section.

Accordingly, the magnet core of a magnet assembly according to the invention is not interrupted in the region of its pole face. The recess, which is provided for receiving the magnet coil, is open in the direction of the side which is averted from the pole face. The magnet core is preferably not surrounded by an operating medium in this region. In this way, the coil receiving space can be sealed off in an optimum manner by means of the magnet core or a core element of the magnet core, so that additional sealing-off measures can be dispensed with if desired. The latter depends, in particular, on the regions in which the magnet core is surrounded by the operating medium. In the present case, it is assumed that an armature which interacts with the magnet coil is regularly surrounded by the operating medium, wherein the armature is arranged on the pole face side of the magnet core. In this respect, at least the pole face is likewise in contact with the operating medium.

The web section is preferably part of the pole face or adjoins the pole face. In particular, the pole face and the web section can lie in one radial plane. However, as an alternative, the pole face side of the magnet core can also be of stepped or curved design. This configuration may be advantageous, in particular, when, according to a further preferred embodiment of the invention, the web section and/or the pole face form/forms a stroke stop for an armature which interacts with the magnet coil. A residual air gap between the armature and the magnet core can then be adjusted by means of the step and/or curvature.

The recess is further preferably entirely or partially covered by a further core element on that side of the core element which is averted from the pole face. Accordingly, the further core element entirely or partially closes the recess, which receives the magnet coil, on the other side. Therefore, the magnet coil is secured from falling out by the further core element.

Advantageously, the further core element is at least partially inserted into the core element which forms the pole face. The at least partial insertion means that an interlocking connection can be formed, said interlocking connection preventing relative movement of the two core elements in relation to one another in the radial direction.

Furthermore, it is proposed that the core element which forms the pole face has an annular collar section which surrounds the further core element at least in sections. The collar section is preferably of hollow-cylindrical design and can have an internal contour which interacts with an external contour of the further core element so as to form an interlocking connection. Furthermore, the collar section can have a centering function.

As a measure which constitutes a development, it is proposed that at least one annular sealing element is arranged in the region of the collar section. In this case, an annular sealing element is preferably arranged between the two core elements. As an alternative or in addition, an annular sealing element can be arranged between the core element and a housing part. In particular, a radial gap, for example a radial gap between the magnet core and a housing part, can be sealed off by means of an annular sealing element which is arranged in the collar region, so that the operating medium cannot pass behind the magnet core. The annular sealing element used can be, for example, an O-ring.

Furthermore, it is proposed that the annular collar section is arranged such that it is situated radially on the outside and/or the core element has a maximum outside diameter in the region of the annular collar section. In this way, the collar section can serve to connect the magnet core to a housing part in a force-fitting manner, for example by the core element, which has the collar section, being pressed into a receiving bore in the housing part. The press-fit intensifies the sealing-off effect of any sealing element in this region or even makes the arrangement of a sealing element unnecessary.

As an alternative or in addition, the further core element can have a collar section for receiving at least one annular sealing element which is preferably situated radially on the outside. Although the arrangement of a sealing element in this region is, in principle, always unnecessary when the further core element is not in contact with the operating medium, the arrangement of a sealing element increases the security. In particular, a sealing element in this region can prevent a harmful medium from entering the coil receiving space from the outside. To this end, the sealing element is preferably arranged on the outer circumference and further preferably used for fixing in position in an outer circumferential groove of the collar section.

The further core element advantageously has a recess for receiving electrical connection lines. The required electrical connection of the magnet coil can be formed by means of the connection lines. Receiving the connection lines in the core element, which is preferably not in contact with the operating medium, ensures that the connection lines do not come into contact with the operating medium either.

A solenoid valve comprising a magnet assembly according to the invention is further proposed, wherein the solenoid valve has an armature which is in the form of a flat armature and interacts with the magnet coil. The core element which forms the pole face at the same time preferably serves as a stroke stop for the armature, wherein the pole face can be of flat, stepped or at least partially curved design in order to define a residual air gap between the armature and the magnet core if desired. The armature and the core element, which forms the pole face, of the multipartite magnet core are furthermore preferably surrounded by an operating medium which is liquid, gaseous, aggressive and/or highly flammable, wherein the situation of the core element being closed in the region of the pole face seals off the coil receiving space which is situated behind said pole face from the operating medium. In addition, the core element is preferably pressed into a housing part of the solenoid valve by means of a collar section, so that it is further ensured, by means of the press-fit and/or by means of an annular sealing element which is inserted in this region, that the operating medium does not flow behind the core element in the direction of the further core element.

BRIEF DESCRIPTION OF THE DRAWINGS

Further advantages of the invention can be gathered from the following description of preferred exemplary embodiments which are illustrated in the attached figures, in which.

DETAILED DESCRIPTION

Figure 1:
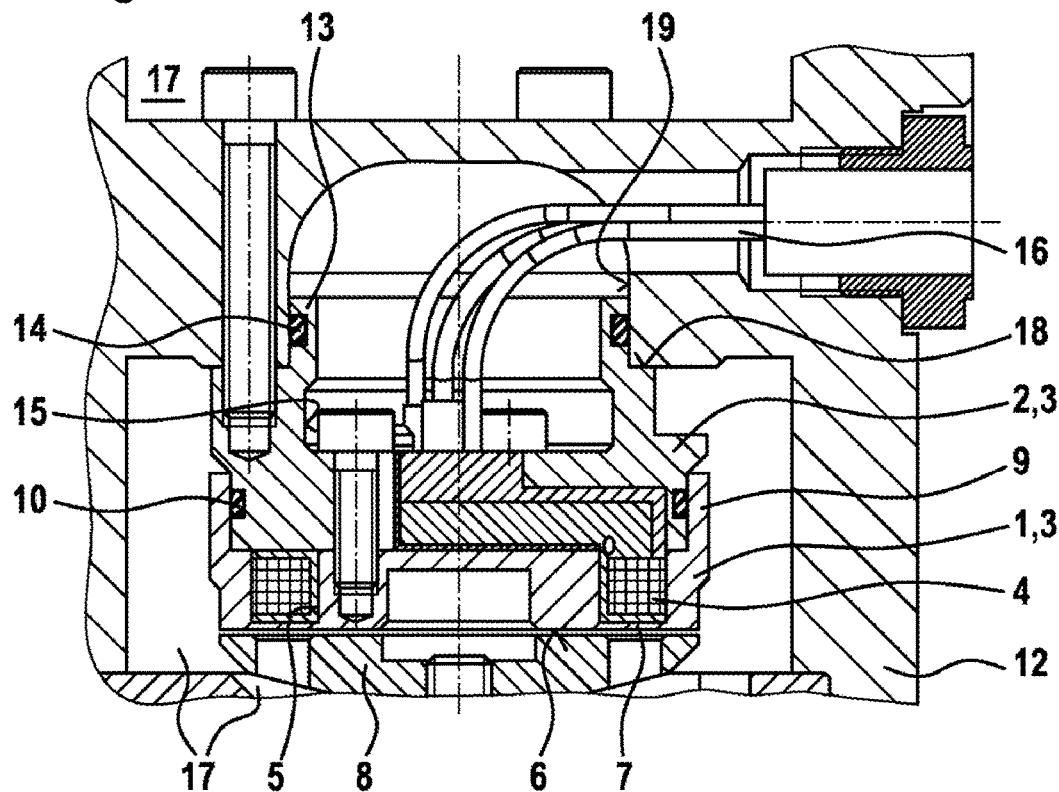
FIG. 1 shows a schematic longitudinal section through a magnet assembly according to the invention which is installed in a solenoid valve according to a first preferred embodiment.

The magnet assembly, illustrated in FIG. 1, which is inserted into a solenoid valve comprises a multipartite magnet core 3 comprising a first core element 1 and a second core element 2. A magnet coil 4 is inserted into an annular recess 5 in the first core element 1 and completely fills the recess 5. The second core element 2 is inserted into an annular collar section 9 of the first core element 1 in such a way that the recess 5 is completely covered by the second core element 2. The recess 5 is closed by means of a thin web section 7 of the first core element 1 in the direction of an armature 8 which interacts with the magnet assembly. At least the surfaces which adjoin the web section 7 form pole faces 6 which ensure that a magnetic field is formed around the magnet coil 4 when current is applied to the magnet coil 4. The electrical connection of the magnet coil 4 which is required to this end is realized by means of electrical connection lines 16 which are routed through a recess 15 in the second core element 2.

During operation of the solenoid valve, the armature 8 and the first core element 1 are surrounded by an operating medium which fills a space 17 for receiving the armature 8 and the magnet core 3. In the present case, both the first core element 1 and the second core element 2 of the magnet core 3 are surrounded by the operating medium. In order to ensure that no operating medium enters the recess 5 in the first core element 1, in which recess the magnet coil 4 is accommodated, an annular sealing element 10 is inserted in the contact region between the first and the second core element 1, 2. For the purpose of fixing in position, the sealing element 10 is inserted into an annular groove on the outer circumference of the second core element 2. A further annular sealing element 14 is provided in the region of a collar section 13 of the second core element 2 in order to prevent the operating medium reaching the outside via the contact region of the second core element 2 of the magnet core 3 with a housing part 12 of the solenoid valve. To this end, the collar section 13 of the second core element 2 is inserted or pressed into a receiving bore 19 in the housing part 12. The collar section 13 is offset slightly radially to the inside, so that a step 18 by means of which the second core element 2 is supported on the housing part 12 is formed.

Figure 2:
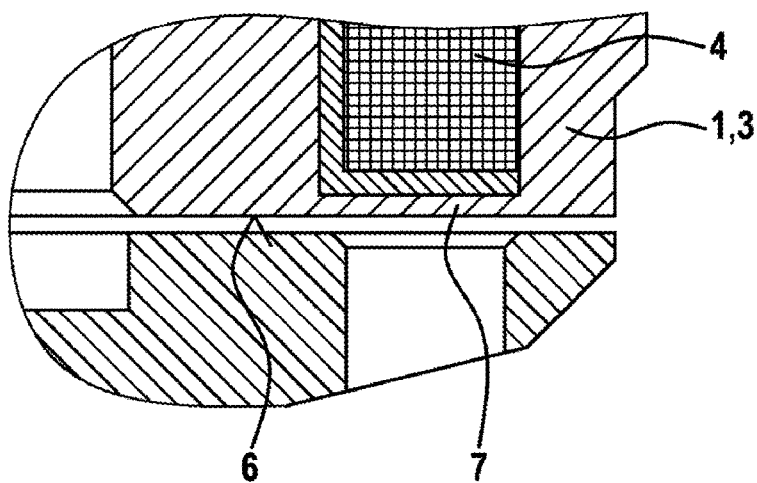
FIG. 2 shows an enlarged detail of FIG. 1.

The leak-tightness of the recess 5 in which the magnet coil 4 is accommodated is further ensured by the first core element 1 being completely closed, and therefore of media-tight design, on the side of the pole face 6. As shown in FIG. 2, the continuous web section 7 closes off the recess 5 at the bottom. To this end, the core element 1 is produced continuously from a solid material.

Figure 3:
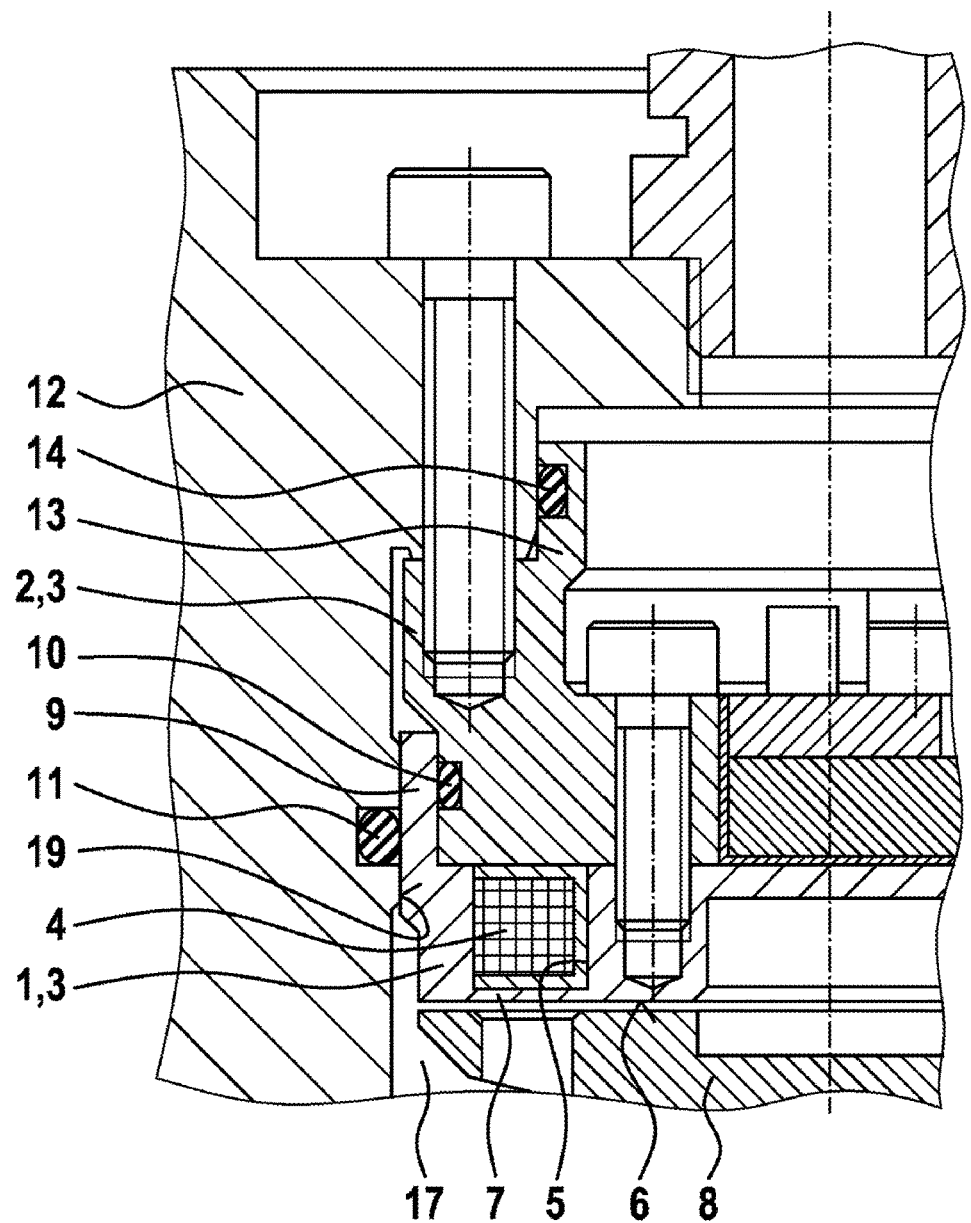
FIG. 3 shows a schematic longitudinal section through a magnet assembly according to the invention which is installed in a solenoid valve according to a second preferred embodiment.

The leak-tightness of the arrangement can further be increased when care is taken that the second core element 2 no longer comes into contact with the operating medium. In order to achieve this, it is possible—as illustrated in the exemplary embodiment of FIG. 3—to use the collar section 9 of the first core element 1 of the magnet core 3 to insert the magnet core 3 into the receiving bore 19 in the housing part 12 under radial prestress. The radial prestress can be produced, for example, by means of an intermediate annular sealing element 11 and/or radial overdimensioning of the collar section 9 in relation to the receiving bore 19 in the housing part 12. Both are realized in the exemplary embodiment of FIG. 3, so that the illustrated annular sealing elements 10, 14 can be dispensed with.

What is claimed is:

1. A magnet assembly for a solenoid valve, the magnet assembly comprising:
a magnet core (3) including a first core element (1) and a second core element (2), the first core element having an internal pole section, an external pole section, and a web section (7) that is continuously formed with and extends between the internal pole section and the external pole section such that the first core element (1) defines an annular recess (5) between the internal pole section and the external pole section, the annular recess being open at a first axial side of the first core element (1) and being closed in a media-tight manner by the web section (7) on a second axial side of the first core element (1), wherein the web section (7) defines at least part of a pole face (6) of the first core element at the second axial side of the first core element, wherein the web section (7) is thin relative to the internal pole section and the external pole section such that an axial dimension of the web section is substantially less than both an axial dimension of the internal pole section and an axial dimension of the external pole section, and wherein the second core element (2) is positioned at the first axial end of the first core element (1), and
a magnet coil (4) in the annular recess (5),
wherein both the web section (7) and the pole face (6) form a stroke stop for an armature (8) which interacts with the magnet coil (4).

2. The magnet assembly as claimed in claim 1, wherein an annular sealing element (10) is arranged between the first and second core elements (1, 2).

3. The magnet assembly as claimed in claim 1, characterized in that the recess (5) is entirely or partially covered by the second core element (2) on the first axial side of the first core element (1) which is averted from the pole face (6).

4. The magnet assembly as claimed in claim 1, characterized in that the second core element (2) is at least partially inserted into the first core element (1) which forms the pole face (6).

5. The magnet assembly as claimed in claim 1, characterized in that the first core element (1) which forms the pole face (6) has an annular collar section (9) which extends from the second axial side of the first core element (1) and surrounds the second core element (2) at least in sections.

6. The magnet assembly as claimed in claim 5, characterized in that at least one annular sealing element (10, 11) is arranged in a region of the collar section (9).

7. The magnet assembly as claimed in claim 6, wherein an annular sealing element (10) is arranged between the first and second core elements (1, 2).

8. The magnet assembly as claimed in claim 6, wherein an annular sealing element (11) is arranged between the first core element (1) and a housing part (12).

9. The magnet assembly as claimed in claim 5, characterized in that the annular collar section (9) is arranged so as to be situated radially on an outside of the first core element (1).

10. The magnet assembly as claimed in claim 5, characterized in that the first core element (1) has a maximum outside diameter in a region of the annular collar section (9).

11. The magnet assembly as claimed in claim 1, characterized in that the second core element (2) has a collar section (13) for receiving at least one annular sealing element (14).

12. The magnet assembly as claimed in claim 1, characterized in that the second core element (2) has a recess (15) for receiving electrical connection lines (16).

13. A solenoid valve comprising a magnet assembly as claimed in claim 1, wherein the solenoid valve has an armature (8) which is in the form of a flat armature and interacts with the magnet coil (4).

14. The magnet assembly as claimed in claim 1, characterized in that the second core element (2) has a collar section (13) for receiving at least one annular sealing element (14) which is situated radially on an outside of the second core element (2).

* * * * *